Nov. 1, 1960  V. M. SANDERS  2,958,185
PRESSURE RESPONSIVE SAFETY DEVICE FOR JET PROPULSION MOTORS
Filed Nov. 13, 1952  2 Sheets-Sheet 1

INVENTOR.
VICTOR M. SANDERS
BY
*D. Gordon Angus*
ATTORNEY

Nov. 1, 1960 V. M. SANDERS 2,958,185
PRESSURE RESPONSIVE SAFETY DEVICE FOR JET PROPULSION MOTORS
Filed Nov. 13, 1952 2 Sheets-Sheet 2

INVENTOR.
VICTOR M. SANDERS
BY
ATTORNEY

United States Patent Office 2,958,185
Patented Nov. 1, 1960

2,958,185
PRESSURE RESPONSIVE SAFETY DEVICE FOR JET PROPULSION MOTORS

Victor M. Sanders, Azusa, Calif., assignor, by mesne assignments, to Aerojet-General Corporation, Cincinnati, Ohio, a corporation of Ohio Filed Nov. 13, 1952, Ser. No. 320,241
9 Claims. (Cl. 60—35.6)

This invention relates to jet propulsion and in particular to jet propulsion motors employing a solid propellant charge in the combustion chamber and provided with an exhaust nozzle to which the products of combustion are ejected.

An object of this invention is to provide a safety device for relieving the pressure in the chamber whenever the pressure becomes dangerously high.

A related object is to provide a rupturable diaphragm arranged so that when rupture occurs the propulsive force and its direction will not be materially disturbed.

A solid propellant rocket motor generally comprises a combustion chamber which may be filled or nearly filled with a solid propellant substance which upon being ignited burns rapidly to produce large volumes of gas that are ejected at high velocity through a restricting nozzle thereby producing thrust.

The normal passageway through a conventional nozzle is normally relatively small compared to the size of the combustion chamber and the volume of gas generated during combustion is very large, as a result, high pressures are sometimes generated within the combustion chamber which approach or reach the burst-strength of the motor. Under such conditions it becomes desirable that the motor be provided with a safety device for rapidly relieving the high pressure in the combustion chamber thereby avoiding injury to the motor.

In my copending application, Serial No. 190,485, filed October 17, 1950, I have disclosed and claimed a new type of annular safety diaphragm which can be ruptured at many points thus preventing a high pressure from bursting the combustion chamber. The gases that escape through the ruptured diaphragm are ducted and released to the atmosphere in a direction perpendicular to the normal longitudinal axis of the motor.

In my present invention the nozzle and diaphragm assembly are fitted in a housing and positioned in such a manner that when the diaphragm ruptures, the gases flow through the orifices formed at that time, and escape through an annular passageway between the nozzle proper and housing. The axis of the annular passageway is parallel to the longitudinal axis of the motor, and therefore the gases are exhausted in substantially the same direction as they would be if they passed through the nozzle itself. This permits the gases escaping through the burst diaphragm orifices to augment the main gas flow escaping from the nozzle and prevents any unsymmetrical forces from acting upon the rocket motor. Even after the diaphragm is ruptured there is still present in effect a nozzle with provides for the escape of the gas jet at high velocity to produce the propulsive force.

A device of this nature is particularly useful in long range rockets that employ a booster and sustainer bi-bi-propellant grain construction since by means of this device all of the escaping gases tend to produce some degree of thrust even though some of the gases exit through the ruptured diaphragm.

An advantage of this device is that it is a simple expedient for attaining a rapid increase in the effective throat area in a rocket motor in those cases where the pressure becomes intolerably high without introducing disturbing forces which would tend to alter the course of the rocket motor.

The foregoing and other features of my invention will be better understood from the following description and accompanying drawings in which:

Figure 6 is a broken isometric view showing the backing up ring.

Figure 1:
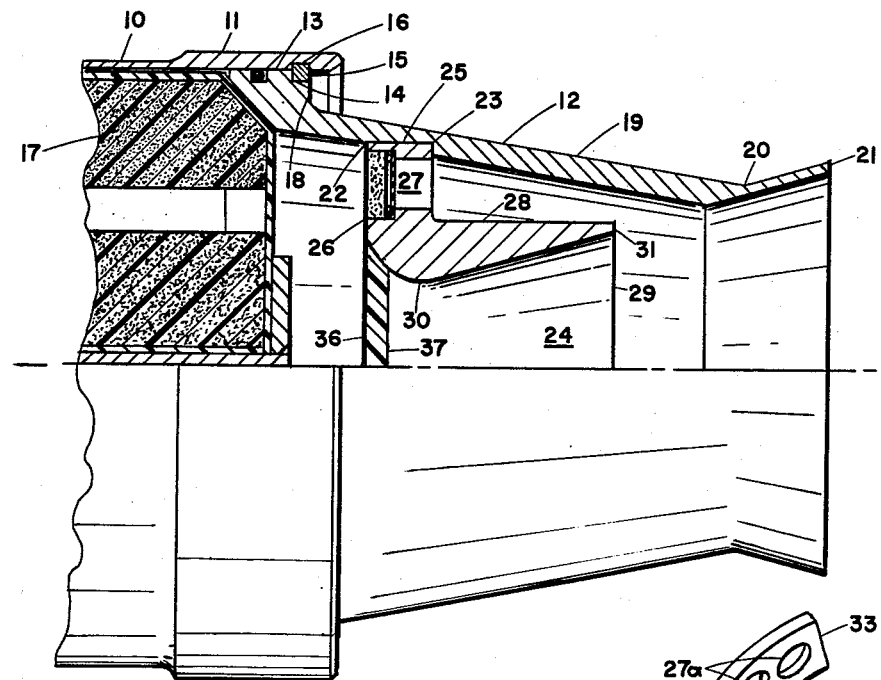
Figure 1 shows a rocket nozzle and housing, according to my invention, in which the gases are vented in an annular stream mounted on a rocket chamber.

Referring to Figure 1, there is shown the rearward end of a rocket motor 10 which terminates in an annular portion 11 having a greater thickness than the motor shell 10 but having substantially the same internal diameter as the motor. Within the annular portion 11 there is introduced a nozzle housing member 12 which at its forward end 13 is substantially thick and has an outer diameter slightly smaller than the inner diameter of annular portion 11 to permit it to slide therein. The outer rearward edge of enlarged portion 13 is provided with a step-shaped groove 14 into which is fitted a snap ring 15 that seats in a corresponding groove 16 provided at the proper position on the inner surface of annular section 11. The forward end of enlarged portion 13 is preferably shaped to conform with the outline of a propellant grain 17 with which it comes in contact.

Beyond the rearward end of the step-cut shoulder 14 the diameter of the nozzle housing 12 decreases sharply forming a shoulder 18 perpendicular to the longitudinal axis of the motor and continues in this plane until the diameter of the outer surface of the nozzle housing is substantially smaller than the inner diameter of annular section 11. From this point the housing continues rearwardly at an angle to the longitudinal axis of the rocket motor so that the diameter progressively reduces as it progresses rearwardly forming a frustum of a conical annulus 19 which terminates at a point 20. From point 20 the outer diameter of the housing again enlarges uniformly as it extends rearwardly to the end 21. The inner diameter of the frustum shaped annulus 19 between point 20 and end 13 is preferably parallel to the outer surface. The thickness of the housing from the point 20 to the end 21 is also preferably parallel to the outer surface but is preferably thinner than portion 19.

Near the forward end of the frustum shaped annulus 19, there is provided a notch which starts at a point 22 on the inner surface of annular section 19 and extends rearwardly in a plane parallel to the longitudinal axis of the motor terminating at a rearward shoulder 23 thereby forming a triangular shaped cut. Within this cut there is fitted the burst diaphragm-nozzle member 24 which comes to rest against the shoulder 23 and has its forward end extending to the end of the triangular cut at the point 22. The burst diaphragm nozzle member comprises a forward cylindrical member 25 having a diameter corresponding to the diameter of the triangular cut starting at 22.

Figure 2:
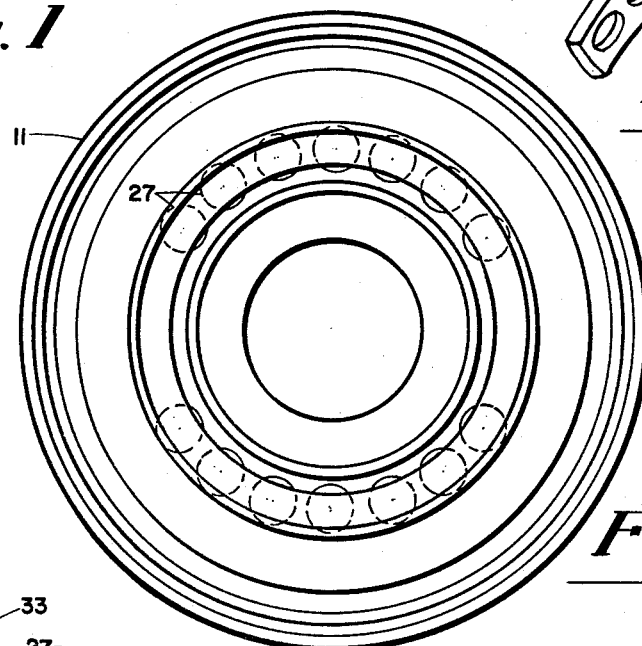
Figure 2 is a front end view of the rocket motor and nozzle combination looking into the housing and nozzle opening.

The cylindrical member 25 is provided with an annular groove 26 machined into its forward surface that has an outer diameter slightly smaller than the outer circumference of the cylindrical member 25. Groove 26 is connected to the rearward surface of the cylindrical member 25 by a plurality of holes 27 which are preferably symmetrically positioned as shown by the dotted circles in Figure 2. At a smaller diameter slightly within the innermost edge of holes 27, cylindrical member 25 joins a rearward cylindrical member 28 and is preferably integral to it. Cylindrical portion 28 continues from the rearward side of cylindrical member 25 for a distance that is just short of the narrowest diameter formed by the reducing annular section 19, when the burst diaphragm-nozzle member is in place.

The center of cylindrical portion 28 is shaped to form a converging-diverging venturi shaped nozzle opening 29 that has its throat 30 located near the forward edge of the cylindrical portion 25. In this manner the diameter at the forward end of the venturi reduces rapidly to the throat 30 and then expands gradually rearwardly until it reaches the end 31 of cylindrical section 28. The angle of the diverging portion of venturi 29 is preferably made to conform to the angle of the diverging portion of the outer housing between 20 and 21.

In this manner the gases coming through the throat 30 of the nozzle 24 will continue to expand uniformly upon reaching the diverging portion of the housing between the point 20 and the end 21 and thereby tend to eliminate any disturbance in the path in which the gases flow.

Figure 5:
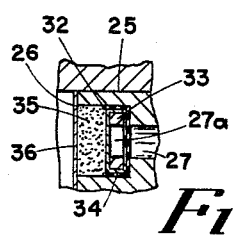
Figure 5 is an enlarged view showing details of the safety diaphragm.
Figure 3:
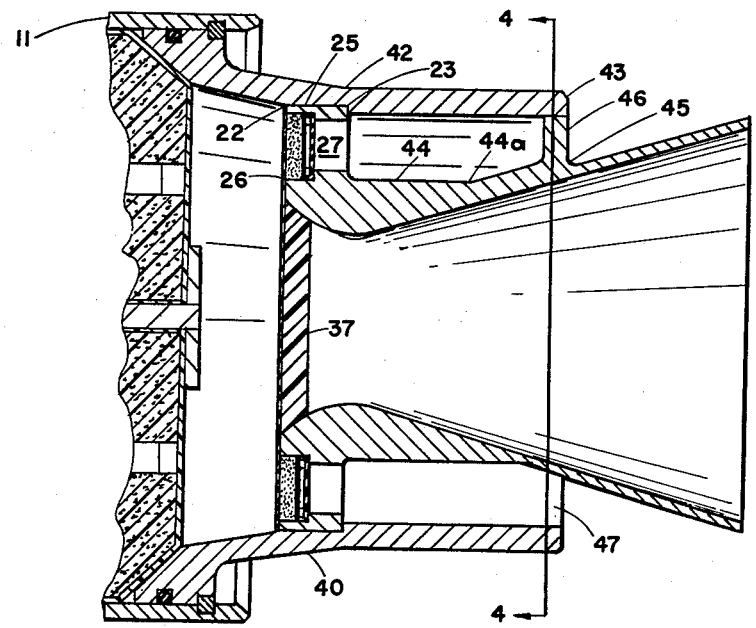

A safety diaphragm is fitted into the annular groove 26, and is better understood by referring to Fig. 5. This device comprises an annular sheet 32 of resilient material such as for example rubber which is slightly wider than the width of the groove 26 so that the inner and outer edges of the flexible annulus will bend parallel to the longitudinal axis of the housing and nozzle when inserted in the groove. A backing up ring 33 having holes 27a corresponding to holes 27 has a thin metal annulus 34 preferably made of sheet copper wrapped around it. This assembly is inserted in the groove 26 and presses tightly against the resilient annular sheet 32. The overlapping portions of annular sheet 32 seal the edge of the metal against the inner and outer circumferences of the annular space 26. The space between the metallic annulus and the forward edge of the annular groove 26 is filled with a suitable heat resistant paste or powder-like material such as for example zinc chromate paste 35, which is capable of offering little or no resistance to large changes in pressure but still prevents the rapid transmission of heat to the metal annulus.

The forward edge of the nozzle and diaphragm member is covered with a protective film 36 such as for example a thin plastic sheet or sheet of paper or similar material to prevent the paste 35 from falling out of the annular groove 26 and likewise to help sustain in place a nozzle closure member 37 which may be of plastic or similar material.

Figure 3:
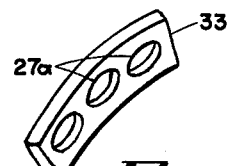
Figure 3 is a modification of the construction in Figure 1 in which the annulus between the nozzle housing and nozzle remains cylindrical but the gases are exhausted through a port which extends only 180° around the nozzle.

Figure 3 shows a modification of the device shown in Figure 1. In this modification the nozzle housing 40 does not extend beyond the end of the nozzle proper, as in the case of Figure 1, but surrounds the nozzle 41 only a portion of its length.

On this modification the housing is constructed as follows: The forward portion of the nozzle housing, up to the point where it emerges from the annular thickened portion 11, is substantially the same as that shown in Figure 1 and the same numbers have been used to designate the similar parts.

Upon leaving the end of the annular portion 11 the nozzle housing slopes slightly, reducing in diameter as it progresses rearwardly to a point 42. From point 42 the nozzle housing continues substantially cylindrical to its end 43.

In this variation the forward end of the nozzle member comprises a forward cylindrical portion 25 which is similar to the one shown in Figure 1. Forward cylindrical portion 25 is proportioned to fit into the tapering portion of the housing 40 in a manner similar to that shown in Figure 1 and when assembled, the rearward end of the cylindrical portion 25 rests against the shoulder 23 of the triangular shape notch which has its beginning at the point 22 in the sloping housing. This forward cylindrical portion is provided with the same safety diaphragm arrangement as Figure 1 having the same groove 26 and closure member 37.

Figure 4:
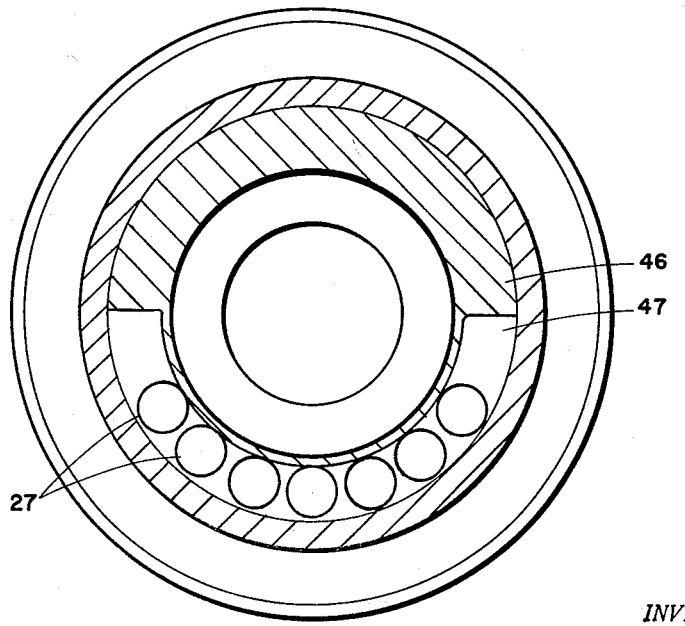
Figure 4, is a view partly in cross section taken on the line 4—4 of Figure 3, showing the opening through which the gases will be exhausted.

At a smaller diameter than the inner edge of the holes 27, the rearward portion of the nozzle starts. This comprises a substantially cylindrical portion 44 preferably integral with the member 25. The cylindrical portion continues parallel to the axis of the motor to a point 44a at which point the outer diameter of the cylindrical nozzle begins to enlarge and continues to enlarge substantially uniformly to the end of the nozzle, which in this modification is preferably slightly smaller in diameter than the outer diameter of the housing 42. At a point 45 in the enlarging nozzle which corresponds to the position of the end 43 of the housing 42, the nozzle member is provided on its outer surface with an integral annular projection 46 which is semi-circular in outline and fills substantially one-half of the space formed between the outer surface of the nozzle and the inner surface of the housing as shown in Figure 4. This annulus 46 closes the upper half of the annular space between the nozzle and the housing and forms an annular opening 47 surrounding the lower one-half portion of the nozzle. In this manner gas escapes through the holes 27 when the diaphragm has burst, and will be released through the opening surrounding the lower half of the nozzle in a direction substantially the same as the gases exiting from the end of the nozzle 41.

The advantages of my present invention residue in the fact that no disturbing forces will be initiated which would cause the rocket to deviate from its course in the event that it is necessary to burst the diaphragm to relieve abnormal pressure generated within the combustion chambers.

The second advantage of my device is that even though the diaphragm is burst, at least a portion of the force exerted by the gases escaping rearwardly through the burst diaphragm openings can be converted into thrust since the path of flow of these gases is substantially in the same direction as the gases normally acting to propel the device and escaping through the throat and end of the nozzle proper.

I claim:

1. A jet propulsion motor comprising a combustion chamber, an exhaust housing attached to the rearward end of said combustion chamber, said housing having its forward end adapted to conform with the rearward end of a propellant grain within said chamber, the forward portion of said housing just rearwardly of its forward end reducing uniformly in diameter for an appreciable distance as it progresses rearwardly, the inner surface of said housing being provided with a cylindrical bore starting from its inner reducing surface at a point rearwardly of said forward end portion and extending longitudinally a distance sufficient to provide a shoulder in said reducing portion, a nozzle member comprising a first cylindrical portion proportioned to fit within said cylindrical bore in said housing and a second portion of circular cross section smaller than the first cylindrical portion, said second portion extending rearwardly from said first cylindrical portion, thereby forming a space between said second portion and said housing, a streamlined axial converging-diverging exhaust orifice provided in said nozzle, an annular groove in the forward surface of said first cylindrical portion of said nozzle commencing near the outer edge of the last-mentioned surface and extending a substantial distance longitudinally into said first cylindrical portion, a plurality of holes extending longitudinally from the bottom of said groove through said first portion, said holes communicating with the space between said second cylindrical portion and said housing, and an annular diaphragm within said annular groove, sealing said holes in said first cylindrical portion.

2. A jet propulsion motor according to claim 1 in which the diaphragm comprises a thin sheet of metal mounted on a backing up annulus provided with a plurality of holes, said holes in said backing up annulus corresponding to the holes in said first cylindrical portion.

3. A jet propulsion motor according to claim 2 in which the bottom of said groove is lined with annulus of plastic material.

4. A jet propulsion motor comprising a combustion chamber, an exhaust housing attached to the rearward end of said combustion chamber, having its forward end adapted to conform with the rearward end of a propellant grain within said chamber, the forward portion of said housing just rearwardly of its forward end reducing uniformly in diameter for an appreciable distance as it progresses rearwardly, said housing being provided with a cylindrical bore starting from its inner reducing surface at a point rearwardly of said forward end portion of said housing and extending longitudinally a distance sufficient to provide a shoulder in said reducing portion, a nozzle member comprising a first cylindrical portion, proportioned to fit within said cylindrical bore in said housing and a second cylindrical portion smaller in diameter than the first cylindrical portion, said second cylindrical portion extending rearwardly from said first cylindrical portion, thereby forming a space between said second cylindrical portion and said housing, a streamlined converging-diverging exhaust orifice provided in said nozzle member, said housing having the reducing portion extending to a point substantially beyond the end of said nozzle and then enlarging uniformly to a slightly larger diameter before reaching its rearward end, an annular groove in said forward surface in said first cylindrical portion of said nozzle commencing near the outer edge of the last-mentioned surface and extending a substantial distance longitudinally into said first cylindrical portion, a plurality of holes extending longitudinally from the bottom of said groove through said first portion, said holes communicating with the space between said second cylindrical portion and said housing, and an annular diaphragm within said annular groove sealing said holes in said first cylindrical portion.

5. A jet propulsion motor comprising a combustion chamber, an exhaust housing attached to the rearward end of said combustion chamber and having its forward end adapted to conform with the rearward end of a propellant grain within said chamber, the forward portion of said housing just rearwardly of its forward end reducing uniformly in diameter for an appreciable distance as it progresses rearwardly, a substantially cylindrical housing portion conforming in diameter with the smallest circular cross-section of the reducing portion of said housing, integral with, and adjoining said reducing portion, said housing being provided with a cylindrical bore starting from its inner reducing surface at a point forward of said cylindrical housing and extending longitudinally a distance sufficient to provide a shoulder in said reducing section; a nozzle member comprising a first cylindrical portion proportioned to fit within said cylindrical bore in the housing and a second cylindrical portion smaller in diameter than the first cylindrical portion, said second cylindrical portion extending rearwardly from said first cylindrical portion, thereby forming a space between said second cylindrical portion and said housing, and a third enlarging portion extending beyond the rearward end of said cylindrical housing portion, a streamlined converging-diverging exhaust orifice provided within said nozzle, a semi-circular flange extending from the outer surface of said third enlarging portion of the nozzle and having its rearward end corresponding to the end of said cylindrical portion of the housing, the outer diameter of said flange corresponding to the inner diameter of said cylindrical portion of said housing, thereby forming a semi-circular space between said nozzle and said housing, said space venting to the outside through the semi-circular opening formed between said housing and the semi-circular flange, an annular groove in the forward surface of said first cylindrical portion of said nozzle starting near the outer edge of the last-mentioned surface and extending a substantial distance longitudinally into said first cylindrical portion, a plurality of holes extending longitudinally from the bottom of said groove through said first portion, said holes communicating with the space between said nozzle and said housing, and an annular diaphragm within said annular groove sealing said holes in said first cylindrical portion.

6. A jet propulsion motor comprising a combustion chamber, an exhaust housing attached to the rearward end of said combustion chamber, a propellant grain within the combustion chamber and at the forward end thereof, the inner surface of said housing being provided with a shoulder, a nozzle member comprising a first portion and a second portion smaller than the first portion, said first portion having an edge for engaging said shoulder and said second portion extending rearwardly from said first portion and leaving a space between said second portion and said housing, an exhaust orifice in said nozzle member, a groove in the forward surface of said first portion of said nozzle member surrounding said exhaust orifice and commencing near the outer edge of the last-mentioned surface and extending a substantial distance longitudinally into said first portion, a plurality of holes extending longitudinally into said first portion, said holes communicating with the space between said second portion and said housing, and a diaphragm within said groove for sealing holes in said first portion.

7. A jet propulsion motor according to claim 6 in which the diaphragm comprises a thin sheet of metal mounted on a backing up annulus provided with a plurality of holes, said holes in said backing up annulus corresponding to the holes in said first portion.

8. A jet propulsion motor according to claim 6 in which the bottom of said groove is lined with an annulus of plastic material.

9. A jet propulsion motor comprising a combustion chamber, an exhaust housing attached to the rearward end of said combustion chamber, a propellant grain within the combustion chamber and at the forward end thereof, the inner surface of said housing being provided with a shoulder, a nozzle member comprising a first portion and a second portion smaller than the first portion, said first portion having an edge for engaging said shoulder, and said second portion extending rearwardly from said first portion and leaving a space between said second portion and said housing, and a third enlarging portion extending beyond the rearward end of said housing, an exhaust orifice in said nozzle member, a flange extending from the outer surface of said third enlarging portion and having its rearward end corresponding to the end of said housing, said flange extending only partway around said third portion leaving an opening between the housing and the nozzle, the outer dimension of said flange corresponding to the inner dimensions of said housing, thereby closing a part of the space between said nozzle and said housing and leaving a part open, said space venting to the outside through the open part, a groove in the forward surface of said first portion of said nozzle member surrounding said exhaust orifice and commencing near the outer edge of the last-mentioned surface and extending a substantial distance longitudinally into said first portion, a plurality of holes extending longitudinally from the bottom of said groove through said first portion, said holes communicating with the space between said nozzle and said housing, and a diaphragm within the groove sealing the holes in the first portion.

References Cited in the file of this patent
UNITED STATES PATENTS
2,515,049  Lauritsen et al. _____ July 11, 1950